United States Patent [19]
Snell

[11] Patent Number: 5,822,966
[45] Date of Patent: Oct. 20, 1998

[54] LAWN MOWER ADJUSTABLE BED-KNIFE

[75] Inventor: Wayne A. Snell, deceased, late of Waterford, Wis., by Kathy L. Snell, administrator

[73] Assignee: Textron Inc., Providence, R.I.

[21] Appl. No.: 906,508

[22] Filed: Aug. 5, 1997

Related U.S. Application Data

[60] Provisional application No. 60/037,820 Feb. 5, 1997.
[51] Int. Cl.⁶ ..................................................... A01D 34/47
[52] U.S. Cl. ................................. 56/249; 56/249.5; 56/7
[58] Field of Search .............................. 56/7, 249.5, 250, 56/249, 294, 251, 252

[56] References Cited

U.S. PATENT DOCUMENTS

| | | | |
|---|---|---|---|
| 1,320,098 | 10/1919 | Sawtelle | 56/7 |
| 1,826,663 | 10/1931 | Hessenbruch | 56/249.5 |
| 1,955,174 | 4/1934 | Clapper | 56/249.5 |
| 2,329,383 | 9/1943 | Bly | 56/252 |
| 2,603,055 | 7/1952 | Boyce et al. | 56/249.5 X |
| 2,646,658 | 7/1953 | Dunham | 56/249 |
| 3,106,813 | 10/1963 | Strasel | 56/249 |
| 4,606,178 | 8/1986 | Saiia | 56/7 X |
| 5,477,666 | 12/1995 | Cotton | 56/7 X |

*Primary Examiner*—Michael J. Carone
*Assistant Examiner*—Robert Pezzuto
*Attorney, Agent, or Firm*—Arthur J. Hansmann

[57] ABSTRACT

A reel type lawn mower with an adjustable cutter bar to alter the position and angulation of the bar relative to the reel. Adjustable mountings extend between the cutter bar and the mower frame, and the cutter bar is adjustable along the arc on the circumference of the rotatable reel.

7 Claims, 2 Drawing Sheets

LAWN MOWER ADJUSTABLE BED-KNIFE

This application relates to provisional application Ser. No. 60/037,820, filed Feb. 5, 1997.

This invention relates to a lawn mower adjustable bed-knife.

BACKGROUND OF THE INVENTION

The prior art is already aware of lawn mowers of the reel type and which have mating bed-knives over which the reel rotates and shears the grass blades which are between the reel and the bed-knife. The bed-knife is normally in a slightly radially-spaced relationship from the rotating reel, and the prior art has various arrangements for adjusting the radial spacing of the bed-knife relative to the reel. Examples of prior art are seen in U.S. Pat. Nos. 2,329,383 and 3,106,813 wherein the disclosures are of the bed-knife being movable toward and away from the reel.

The present invention provides for adjustment of the bed-knife relative to the reel, and it particularly provides for adjusting the angulation of the cutting edge of the bed-knife relative to the circumferential sweep of the cutting edges of the reel itself. That is, the bed-knives have planar cutting surfaces facing the reel, and they have a cutting edge at the leading end of that surface for engagement with the grass blades trapped between the reel and the bed-knife. It is the adjustment of the cutting surface both along the circumference of the rotation of the tips of the reel as well as the adjustment of the angulation of the cutting surface relative to that circumference that is involved in this invention.

Accordingly, it is an object of this invention to provide an assembly of a rotatable lawn mower reel and cooperative bed-knife wherein the angulation of the cutting surface of the bed-knife can be altered relative to the circumferential movement of the cutting edges of the reel moving past the bed-knife. In the actual disclosure herein, the adjustment is between two positions for altering the angulation, and that adjustment is desirable for at least two different cutting conditions.

Also, the adjustment of the bed-knife as disclosed herein provides for a sturdier assembly of the reel on its mountings.

In one adjusted position, it may be deemed the high angle position, and in the other adjusted position, it may be deemed the low angle position. In the high angle position, the cutting condition may be such that there is only a minimum of thatch and it is of a high maintenance type of turf, commonly on golf courses, and the cutting action is deemed to be an aggressive cut. On the low angle condition, this is for cutting grass or grass with thatch and it is a less aggressive cut and it is on low maintenance types of turf and it is here that the bed-knife lends its structural support for the reel assembly.

DETAILED DESCRIPTION OF THE PREFERRED EMBODIMENT

Figure 3:
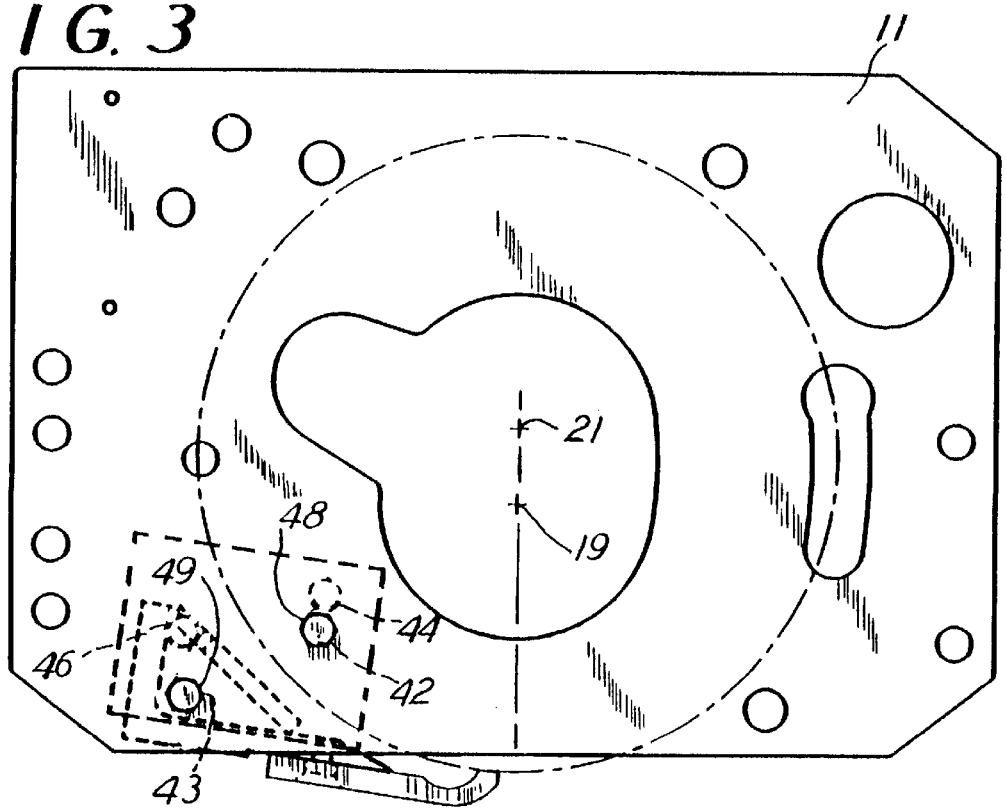

In the embodiment shown in these drawings, this is the type of mower where the reel is vertically adjustable toward and away from the bed-knife or cutter bar. Reel 10 is a conventional type of lawn mower reel which is rotatably supported in the two spaced-apart side plates 11 and 12, such as by rotation supports which are not shown, but are known to anyone skilled in the art. A cross tube 13 is fixedly connected to the plates 11 and 12 to retain them in their vertical planes, as shown, and spaced apart. Of course the mower shaft 14 extends into the irregularly shaped openings 16 and 17 in the plates 11 and 12, respectively. The shaft longitudinal axis 18 is indicated by the assembly line to be positioned in the openings 16 and 17, and the axis 18 can be moved between the two center line positions 19 and 21, as indicated in FIG. 3. Mounting holes, such as the hole 22 in plate 12 attaches the reel support to the plate 12, and the support is also attached at the slot 23 in the plate 12 so that the unshown support can be swung up and down for the conventional up and down adjustment of the reel 10.

Also the lawn mower would of course have its ground-engaging members, preferably rollers which are not shown. All of the foregoing is conventional and will be readily understood by anyone skilled in the art.

Also mounted on the side plates 11 and 12 is the bed-knife or cutter bar assembly 24. This assembly includes the bed-knife backing piece 26 consisting of an upstanding portion 27 and a horizontally-disposed portion 28. The backing piece 26 extends for substantially the length of the reel 10, and it has upstanding end pieces 29 and 31 affixed to the opposite ends thereof.

A bar 32 is the cutter bar or bed-knife which is attached to the underneath portion 33 of the backing 26, such as by means of a plurality of screws 34. Thus, the backing 26 and the bar 32 present an assembled bed-knife or cutter bar.

Figure 1:
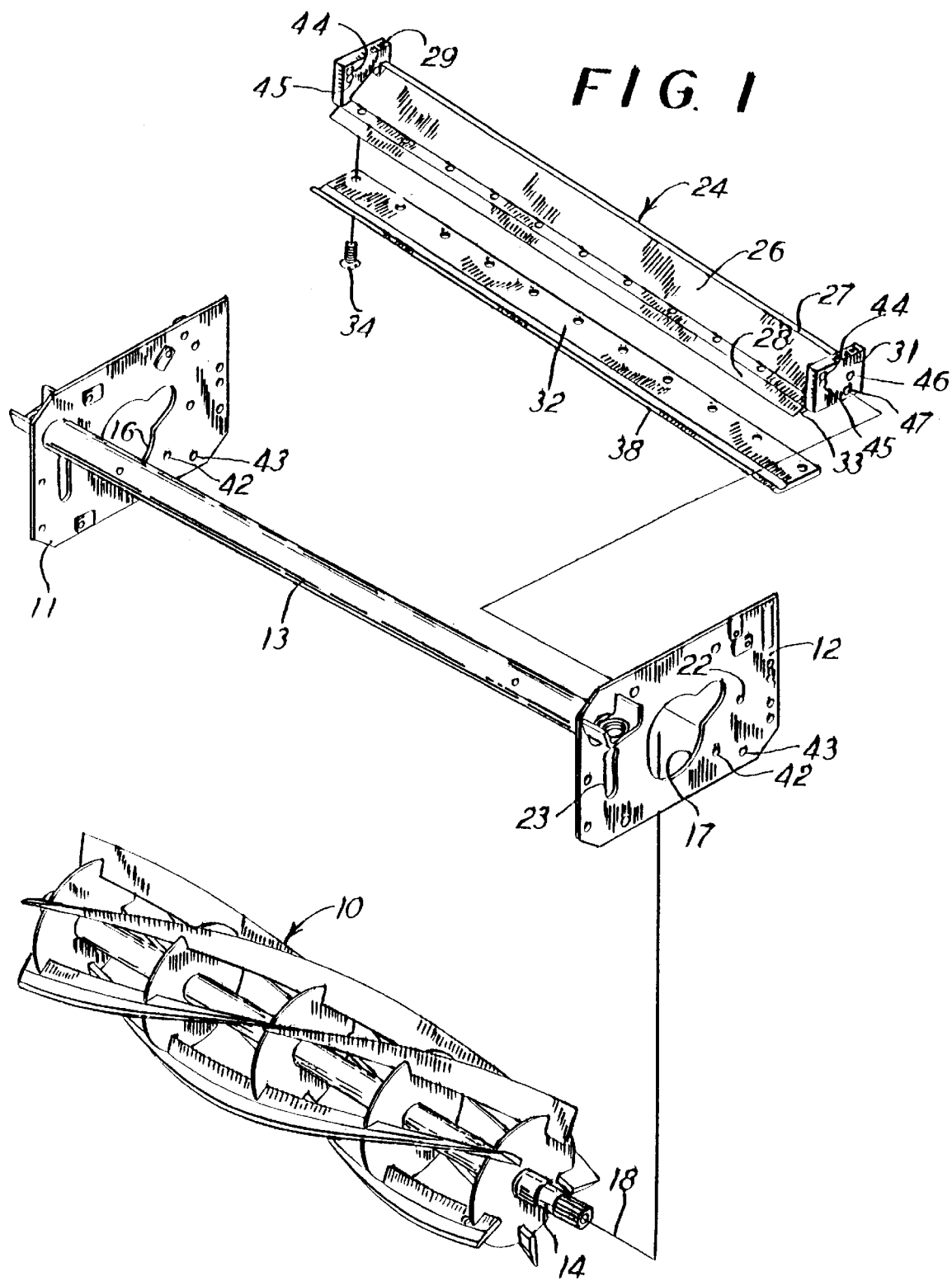
FIG. 1 is an exploded perspective view of the parts constituting this invention.
Figure 2:
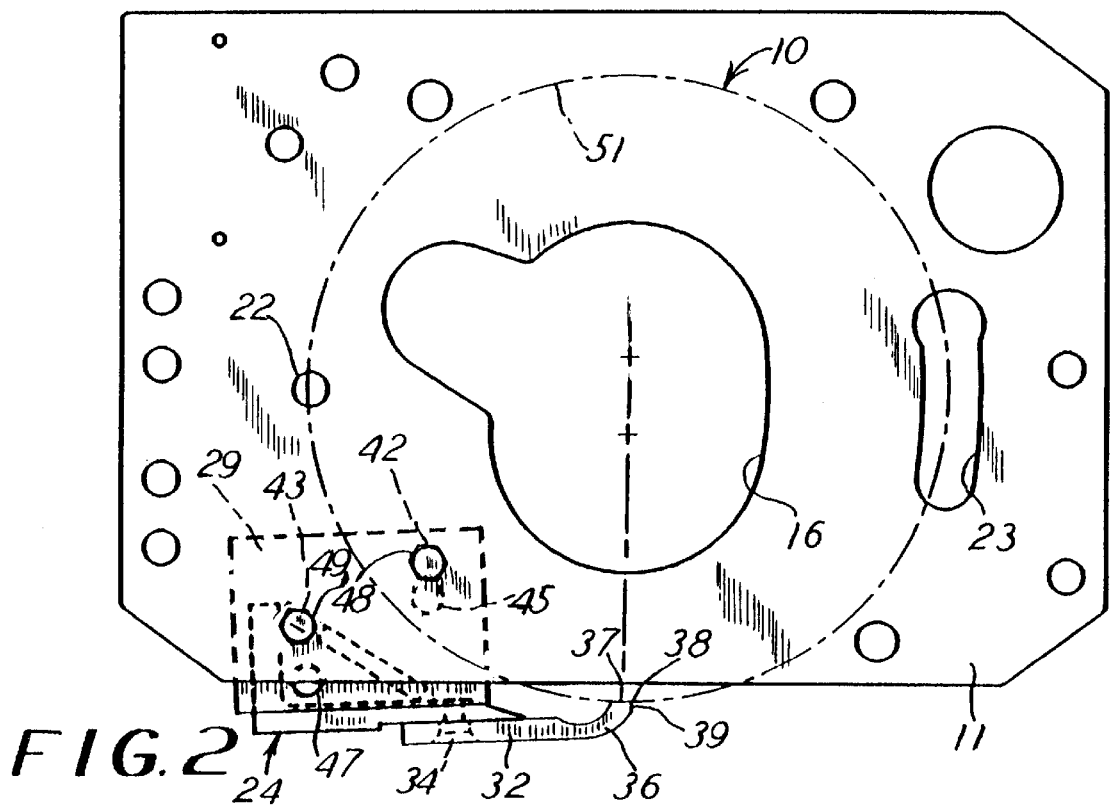
FIGS. 2 and 3 are enlarged right side elevational views of a portion of that shown in FIG. 1 with the bed-knife shown in its two different positions.

As seen in FIGS. 2 and 3, the bed-knife has an arcuate portion 36 which extends forwardly of the backing 26 and which terminates in a flat cutting surface 37 which is faced upwardly and which therefore also presents a forwardly disposed cutting edge 38. Of course in FIGS. 2 and 3, the dot-dash circle 51 represents the outer circumference of the reel 10 in its end view. The very front nose or portion 39 of the cutter bar is formed to be a vertical surface which in combination with the cutter surface 37, forms the cutting edge 38 between those surfaces 37 and 39. Of course the surfaces 37 and 39, along with the cutting edge 38, extend for the length of the cutter bar 32 and that is the length the reel 10.

The cutter bar assembly designated 24 is adjustably secured to and mounted on the side plates 11 and 12. Thus, the plates 11 and 12 both have screw hole openings 42 and 43 on each plate 11 and 12. The backing member 26 has four threaded screw openings 44, 45, 46 and 47 on each end portion 29 and 31. A spacing between the respective two holes 44 and 46 and the holes 45 and 47 is the same as the spacing between the holes 42 and 43, and thus those holes respectively align so that they receive the respective screws 48 and 49 and thereby attach the bed-knife assembly 24 to the plates 11 and 12, as seen in FIGS. 2 and 3. That is, at any one time, and only at one time, will the pair or set of holes 44 and 46 and/or the pair or set of holes 45 and 47 respectively align with the holes 42 and 43 for the assembly shown and mentioned in connection with FIGS. 2 and 3.

FIG. 3 shows that the assembly is made with the alignment of the holes 45 and 47 relative to the holes 42 and 43, and thus the cutting surface 37 is in the high position as it upwardly faces the circumference of the reel 10, as shown. FIG. 2 then shows that the holes 44 and 46 are aligned with the holes 42 and 43, respectively, and thus the cutter surface 37 is at the low angle for that type of cutting mentioned previously.

With this arrangement, the cutter bar assembly 24 is adjustable for positioning its cutting surface 37 and thus its cutting edge 38, relative to the reel circumference designated 51, and the adjustment is accurate in that it utilizes threaded holes in the end portions 29 and 31 in the backing member 26. The adjustment positions the cutting surface 37 and the cutting edge 38 in adjusted positions along the circumference 51, such as in a position where the cutting edge 38 is rearwardly of the vertical plane through the axes 19 and 21 in FIG. 3, for instance.

In the conventional arrangement of a mower reel, the reel extends in a radius from its rotation axis 18 to its rotational sweep along its circumference 51. In this invention, the cutting edge 38 is disposed at a fixed radius from the axis 18 in both positions of adjustment as seen in FIGS. 2 and 3, and the adjustment as seen in FIGS. 2 and 3, and the adjustment is made at the fixed radius in an arc about the axis 18, rather than toward and away from the circumference 51.

What is claimed is:

1. In a lawn mower with an adjustable bed-knife, a mower frame including spaced-apart side plates, a cutting reel having an extended length and being rotatably mounted about its elongated axis and on said side plates, ground supports mounted on said frame for presenting said reel in an elevation above the ground and for mobilizing said mower in a forward and a rearward ground-movement direction, and said bed-knife mounted on said plates and having a cutting edge disposed in a circumferential space adjacent to and facing said reel and with said cutting edge extending along a line for the length of said reel for the cutting of grass during the rotation of said reel, the improvement comprising an adjustable connection operative between said side plates and said bed-knife for adjustably supporting said bed-knife and being arranged to present said cutting edge in two different operating positions in said circumferential space and at the same radial distance from said elongated axis for both said positions, and said adjustable connection being arranged to effect pivoting of said bed-knife in an arc centered on said elongated axis to position said cutting edge in a selected one of said two positions along said circumferential space and at said radius.

2. The lawn mower with an adjustable bed-knife as claimed in claim 1, wherein said adjustable connection consists of releasable fasteners inter-engaged with said bed-knife and said side plates and having two selectable positions for setting said bed-knife in the two different positions along said circumferential space.

3. The lawn mower with an adjustable bed-knife as claimed in claim 2, wherein said releasable fasteners include screws and screw holes on both said bed-knife and said plates, and with said holes being in two sets for alternate reception of said screws in the adjustable positioning of said bed-knife.

4. The lawn mower with an adjustable bed-knife as claimed in claim 1, wherein said adjustable connection is further arranged to effect movement of said cutting edge between forward and rearward positions relative to the vertical plane extending along said axis of said reel.

5. The lawn mower with an adjustable bed-knife as claimed in claim 1, wherein said bed-knife has a cutting surface disposed in said circumferential space and facing said reel at an angulation thereto, and said adjustable connection is arranged for the pivoting of said bed-knife to thereby position said cutting surface in said circumferential space and in a manner to alter the angulation of said cutting surface relative to facing said reel.

6. The lawn mower with an adjustable bed-knife as claimed in claim 1, including a backing member attached to said bed-knife and presenting an assembly therewith and having upstanding ends, and said connection includes screw holes on said side plates and said upstanding ends for mounting of said assembly onto said side plates.

7. The lawn mower with an adjustable bed-knife as claimed in claim 6, wherein said upstanding ends each contain four of said screw holes disposed in two pairs thereof for alignment in pairs with said screw holes in said side plates.

* * * * *